United States Patent
Gusev et al.

(10) Patent No.: US 12,460,923 B2
(45) Date of Patent: Nov. 4, 2025

(54) SYSTEMS AND METHODS OF 3D OBJECT RECONSTRUCTION USING A NEURAL NETWORK

(71) Applicant: ARTEC EUROPE S.À R.L., Senningerberg (LU)

(72) Inventors: Gleb Alexandrovich Gusev, Mensdorf (LU); Vadim Bereznyuk, Moscow (RU); Kseniya Cherenkova, Luxembourg (LU); Ilya Arzhannikov, Bertrange (LU)

(73) Assignee: ARTEC EUROPE S.À R.L., Senningerberg (LU)

( * ) Notice: Subject to any disclaimer, the term of this patent is extended or adjusted under 35 U.S.C. 154(b) by 57 days.

(21) Appl. No.: 18/166,396

(22) Filed: Feb. 8, 2023

(65) Prior Publication Data

US 2023/0184542 A1     Jun. 15, 2023

Related U.S. Application Data

(63) Continuation of application No. PCT/IB2021/000555, filed on Aug. 13, 2021.

(60) Provisional application No. 63/070,066, filed on Aug. 25, 2020.

(51) Int. Cl.
    *G01B 11/25*     (2006.01)
(52) U.S. Cl.
    CPC ...... *G01B 11/2513* (2013.01); *G01B 11/2518* (2013.01)

(58) Field of Classification Search
    CPC ................. G01B 11/2513; G01B 11/2518
    See application file for complete search history.

(56) References Cited

U.S. PATENT DOCUMENTS

2019/0371053 A1*  12/2019  Engholm ............... G06T 17/10

FOREIGN PATENT DOCUMENTS

| CN | 111043988 A |   | 4/2020 |              |
|----|-------------|---|--------|--------------|
| CN | 111523618 A | * | 8/2020 | G01B 11/25   |
| EP | 3575742 A1  | * | 12/2019| G01B 11/2433 |

(Continued)

OTHER PUBLICATIONS

"Fringe pattern analysis using deep learning", School of Electronic and Optical Engineering, Nanjing University of Science and Technology, No. 200 Xiaolingwei Street, Nanjing, Jiangsu Province 210094, China, Jul. 8, 2018, by Feng et al.(Year: 2018).*

(Continued)

*Primary Examiner* — Jamil Ahmed
(74) *Attorney, Agent, or Firm* — Thompson Coburn LLP

(57) ABSTRACT

In accordance with some embodiments, a method is provided for determining correspondence between a projection pattern and an image of the projection pattern shone onto the surface of an object. The method includes obtaining an image of an object while a projection pattern is shone on the surface of the object. The method further includes, using a neural network to output a correspondence between respective pixels in the image and coordinates of the projection pattern. The method further includes, using the correspondence between respective pixels in the image and coordinates of the projection pattern, reconstructing a shape of the surface of the object.

20 Claims, 12 Drawing Sheets

(56) References Cited

FOREIGN PATENT DOCUMENTS

JP 2019045182 A 3/2019
WO 2019058750 A1 3/2019

OTHER PUBLICATIONS

Artec Europe S.A.R.L., International Search Report and Written Opinion, PCT/IB2021/000555, Nov. 23, 2021, 13 pgs.
Artec Europe S.A.R.L., International Preliminary Report on Patentability, PCT/IB2021/000555, Feb. 28, 2023, 9 pgs.
Feng, Fringe pattern analysis using deep learning, Advanced Phtotonics, vol. 1 No. 2, Mar.-Apr. 2019, 7 pgs.
Furukawa et al, "Pattern Analysis Using CNN and Sequential Measurements integration in a 3D Endoscope System Using Structured Light Projection," IEICE Technical Report, Japan, The Institute of Electronics, Information and Communication Engineers, Jan. 22, 2020, vol. 119, No. 399, pp. 109-114.
Riegler et al, "Connecting the Dots: Learning Representations for Active Monocular Depth Estimation", 2019 IEEE/CVF Conference on Computer Vision and Pattern Recognition (CVPR), USA, IEEE, Jun. 15, 2019, pp. 7616-7625.
English translation of Office Action for Japanese Application No. 2023-538580, dated Jul. 30, 2025.

\* cited by examiner

500

500 Obtain an image of an object. The image includes a plurality of imaged elements of an imaged pattern. The imaged pattern corresponds to a projection pattern that is projected onto a surface of the object. The projection pattern includes a plurality of projection elements.

520 Use a neural network to output a correspondence between the plurality of imaged elements and the plurality of projection elements.

| 522 Input a value for each respective pixel of the image of the object onto a respective node in an input layer of the neural network.

| 524 Each respective pixel of the image of the object corresponds to a respective node in an output layer of the neural network. A a value for the respective node in the output layer of the neural network represents the correspondence between the respective pixel and the plurality of projection elements of the projection pattern.

| 526 The output layer of the neural network has a same size as the image of the object.

| 528 An output layer of the neural network is smaller than a size of the image.

| 530 Input information about the projection pattern into an input layer of the neural network.

| 532 The plurality of projection elements of the projection pattern projected onto the surface of the object comprise non-coded elements.

| 534 The plurality of projection elements of the projection pattern projected onto the surface of the object comprise lines.

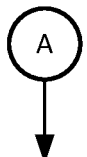

535 The neural network is trained using simulated data. The simulated data includes a plurality of simulated images and each of the plurality of simulated images includes a simulated pattern that includes a plurality of simulated elements. Each of the plurality of simulated elements corresponds to a respective projection element of the plurality of projection elements projected onto the surface of a respective simulated object. Each of the plurality of simulated images also includes data indicating a correspondence between the plurality of simulated elements of the simulated pattern and the plurality of projection elements of the projection pattern.

536 For each of the plurality of simulated images, the respective simulated object includes texture information.

538 The texture information for the respective simulated object is texture information other than a natural texture of the respective simulated object.

540 The texture information for the respective simulated object includes features that are similar to the plurality of projection elements of the projection pattern.

542 The texture information for the respective simulated object includes text.

544 The texture information for the respective simulated object includes lines.

550 The neural network is a first neural network. Use a second neural network to output an offset from the correspondence between the plurality of imaged elements and the plurality of projection elements determined by the first neural network.

600

601 At a computing device having one or more processors and memory storing one or more programs configured for execution by the one or more processors:

610 Generate simulated data that includes: (i) a plurality of simulated images of a projection pattern projected onto a surface of a simulated object; (ii) object data indicating a shape of the respective simulated object; and (iii) correspondence data. The projection pattern includes a plurality of projection elements, and each of the simulated images includes a simulated pattern that includes a plurality of simulated elements. The plurality of simulated elements correspond to respective projection elements of the projection pattern. The correspondence data indicates a correspondence between the simulated elements and the respective projection elements.

611 The simulated data also includes texture information regarding the respective simulated object.

612 The texture information for the respective simulated object is texture information other than a natural texture of the respective simulated object.

613 The texture information for the respective simulated object includes features that are similar to the plurality of elements of the projection pattern.

614 The texture information for the respective simulated object includes text.

615 The texture information for the respective simulated object includes lines.

616 The respective simulated object includes one or more sharp features.

┌─────────────────────────────────────────────────────────────┐
│ 702 Obtain an image of an object while a projection pattern is shone on the surface of the object │
└─────────────────────────────────────────────────────────────┘
                              │
                              ▼
┌─────────────────────────────────────────────────────────────┐
│ 704 Use a neural network to output a correspondence between respective pixels in the image and coordinates of the projection pattern │
└─────────────────────────────────────────────────────────────┘
                              │
                              ▼
┌─────────────────────────────────────────────────────────────┐
│ 706 Use the correspondence between respective pixels in the image and coordinates of the projection pattern, reconstructing a shape of the surface of the object. │
└─────────────────────────────────────────────────────────────┘

Figure 7

SYSTEMS AND METHODS OF 3D OBJECT RECONSTRUCTION USING A NEURAL NETWORK

PRIORITY APPLICATION

This application is a continuation of International Application No. PCT/IB2021/000555, filed Aug. 13, 2021, which claims priority to U.S. Provisional Application No. 63/070,066, filed Aug. 25, 2020, each of which is hereby incorporated by reference in its entirety.

TECHNICAL FIELD

The present disclosure relates generally to three-dimensional scanning technology and, more particularly, to three-dimensional scanning technology that utilizes neural networks.

BACKGROUND

Three-dimensional (3D) scanning technologies can build a 3D model of the surface of a physical object. Three-dimensional scanning has applications across many fields, including industrial design and manufacturing, computerized animation, science, education, medicine, art, design, and others.

SUMMARY

The present disclosure relates to 3D scanning technology. One approach to 3D scanning is the use of so-called "structured light" in which a projector projects a known pattern of light on to the surface of an object (hereinafter, "projection pattern"). For example, light from the projector may be directed through a slide that has the pattern printed on it. The shape of the surface of the object is inferred from the distortions in the pattern of light captured by a camera. One or more cameras may be used to obtain images of the reflection of the pattern on the object. By measuring positions of the pattern in the image (e.g., measuring distortions of the pattern), a computer system may determine the positions on the surface of the object using simple geometric calculations such as, for example, a triangulation algorithm.

In order to determine the positions on the surface of the object, the computer system needs to know which point within the projection pattern corresponds to which point in the image. In accordance with some embodiment, the correspondence between image pixels and the coordinates of a projection pattern can be inferred using a trained neural network.

In accordance with some embodiments, a method is provided for disambiguating imaged elements in a structured light approach to 3D scanning. The method includes obtaining an image of an object. The image includes a plurality of imaged elements of an imaged pattern. The imaged pattern corresponds to a projection pattern that is projected onto the surface of the object, and the projection pattern includes a plurality of projection elements. The method also includes using a neural network to output a correspondence between the plurality of imaged elements and the plurality of projection elements. The method further includes using the correspondence between the plurality of imaged elements and the plurality of projection elements to reconstruct a shape of the surface of the object.

In accordance with some embodiments, a method is provided for determining correspondence between a projection pattern and an image of the projection pattern shone onto the surface of an object. The method includes obtaining an image of an object while a projection pattern is shone on the surface of the object. The method further includes, using a neural network to output a correspondence between respective pixels in the image and coordinates of the projection pattern. The method further includes, using the correspondence between respective pixels in the image and coordinates of the projection pattern, reconstructing a shape of the surface of the object.

In accordance with some embodiments, a method is provided for training the neural network. The neural network is trained using simulated data that includes a plurality of simulated images of a projection pattern projected onto a surface of a simulated object. The projection pattern includes a plurality of projection elements and each of the simulated images includes a simulated pattern that includes a plurality of simulated elements. The plurality of simulated elements correspond to respective projection elements of the projection pattern. The simulated data also includes data indicating a shape of the respective simulated object and data indicating a correspondence between the simulated elements and the respective projection elements. Using the simulated data, the neural network is trained to determine correspondence between the plurality of projection elements of the projection pattern and the plurality of simulated elements of the simulated pattern. The trained neural network is stored for subsequent use in reconstructing images.

In accordance with some embodiments, another method is provided for training the neural network. The method includes generating simulated data, comprising: a plurality of simulated images of a projection pattern projected onto a surface of a respective simulated object; data indicating a shape of the respective simulated object; and data indicating a correspondence between respective pixels in the simulated images and coordinates on the projection pattern. The method further includes, using the simulated data to train a neural network to determine correspondence between images and projection pattern. The method further includes storing the trained neural network for subsequent use in reconstructing images.

In accordance with some embodiments, a computer system is provided. The computer system includes one or more processors and memory storing instructions for performing any of the methods described herein.

In accordance with some embodiments, a non-transitory computer-readable storage medium storing instructions is provided. The non-transitory computer-readable storage medium includes instructions which, when executed by a computer system, cause the computer system to perform any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A-5C illustrate a flow chart of a method of 3D reconstruction, in accordance with some embodiments.

FIGS. 6A-6B illustrate a flow diagram of a method of training a neural network in accordance with some embodiments.

FIG. 7 illustrates a flowchart of another method 3D reconstruction, in accordance with some embodiments.

DESCRIPTION OF EMBODIMENTS

Reference will now be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure inventive aspects of the embodiments.

Figure 1A:
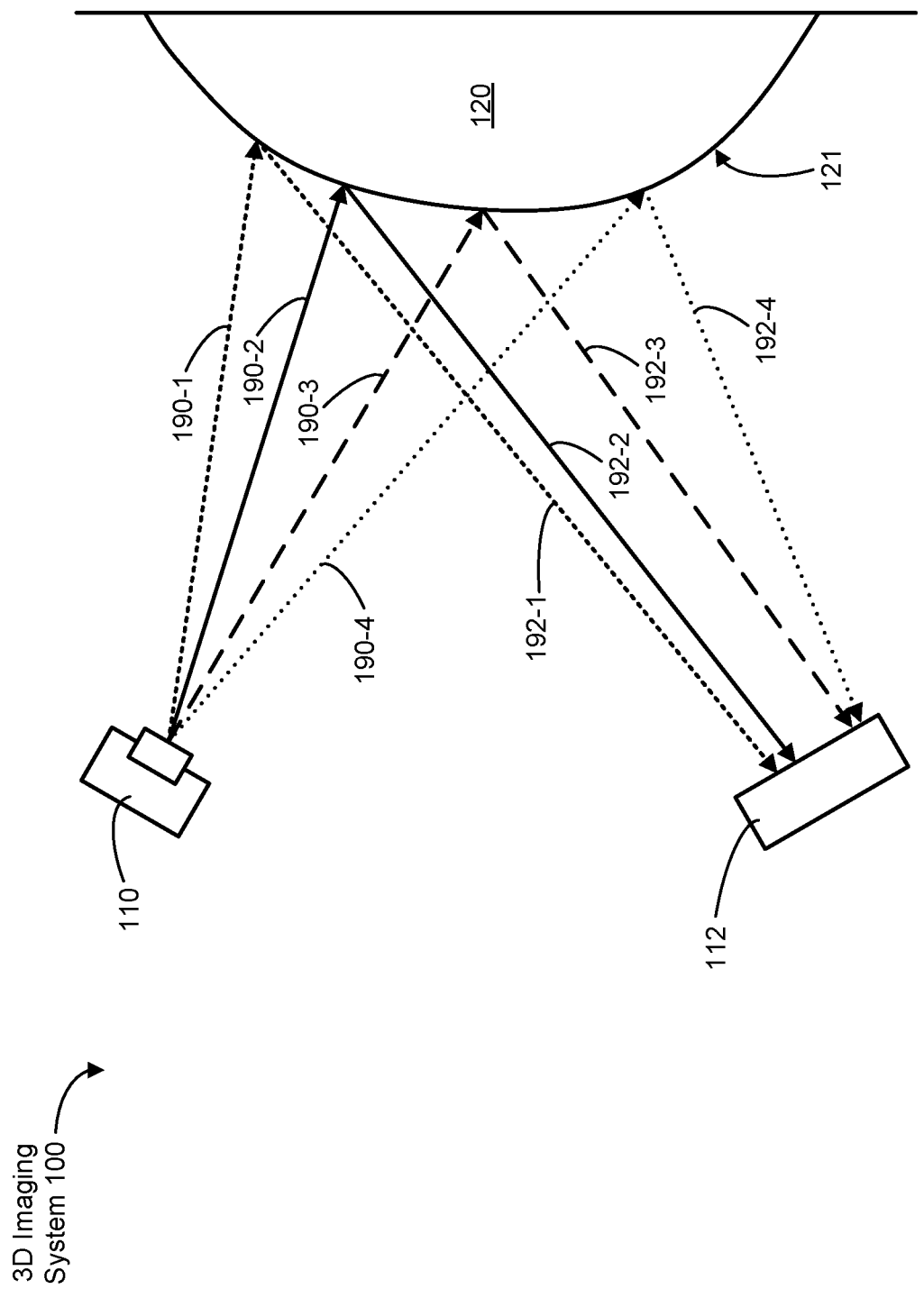
FIGS. 1A-1B illustrate an imaging system in accordance with some embodiments.
Figure 1B:
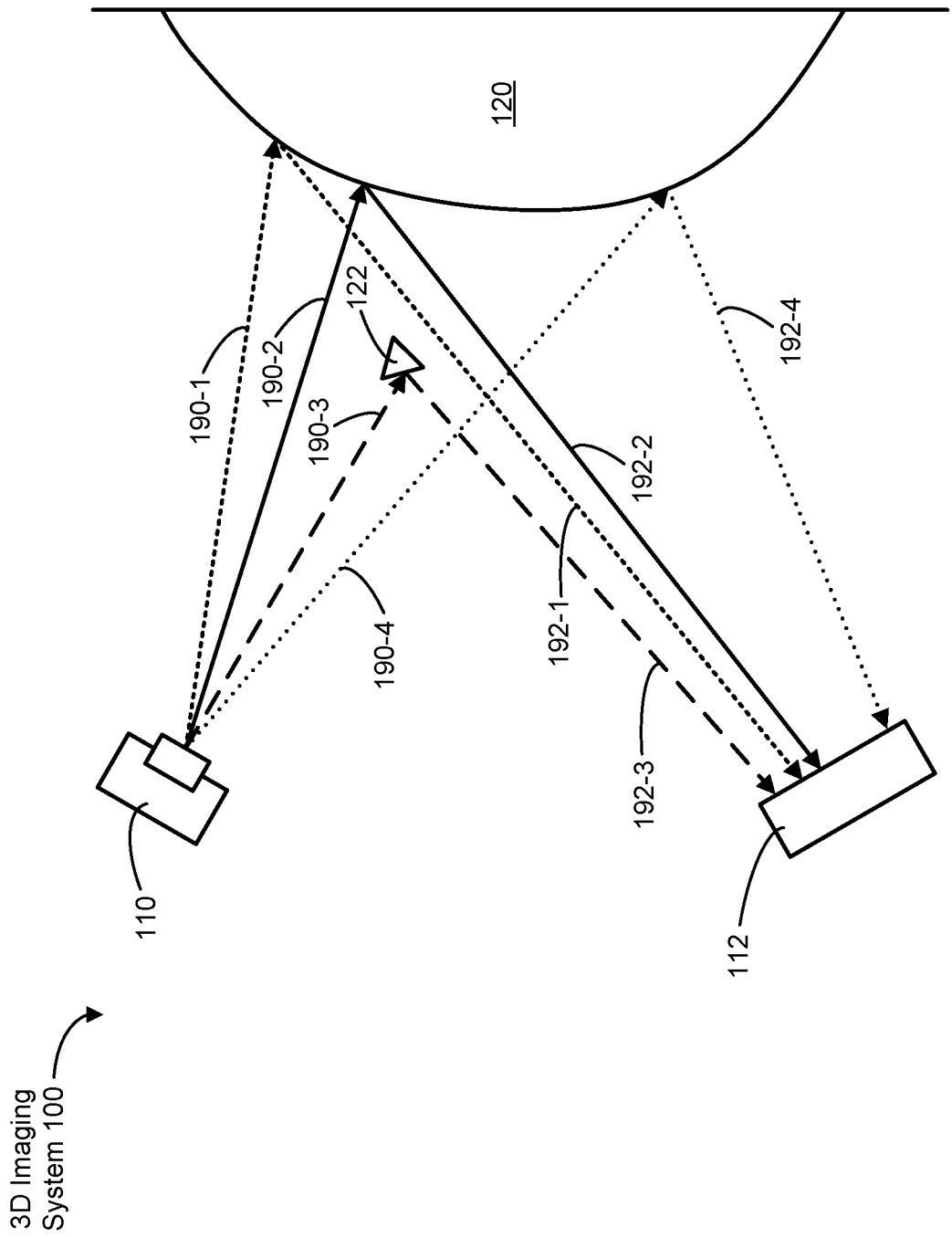

FIGS. 1A-1B illustrate a three-dimensional ("3D") imaging environment 100 that includes a projector 110 and one or more cameras 112 (e.g., sensors) in accordance with one embodiment of the instant invention. Note that, in various embodiments, more than one projector and/or more than one camera may be used. As shown in FIG. 1A, the projector 110 is configured to project a projection pattern (also sometimes referred to as "structured illumination") onto an object 120 to be imaged. To do so, in some embodiments, light from the projector is projected through a slide that has the projection pattern printed thereon. The projection pattern includes a plurality of projection elements. Non-limiting examples of projection patterns include a series of contrasting lines (e.g., black and white lines), a series of contrasting zig-zag lines, and a grid pattern of dots. Further examples of projection patterns are described in U.S. application Ser. No. 11/846, 494, which is hereby incorporated by reference in its entirety.

Light rays 190-1 to 190-4 each correspond to a respective projection element of the projection pattern (e.g., different lines in the projection pattern). For example, ray 190-1 represents a first projection element in the projection pattern projected from the projector 110 onto a surface 121 of the object 120, and ray 190-2 represents another projection element that is projected from the projector 110 onto the surface 121 of the object 120. The light rays 190 are reflected at the surface 121 of the object 120 (as reflected light rays 192-1 through 192-4, each corresponding, respectively, to light rays 190-1 through 190-4). At least a portion of the light is captured by the one or more cameras 112.

In some embodiments, the camera(s) 112 capture(s) a plurality of images of the object 120 while the surface 121 of the object 120 is illuminated with the projection pattern. In some embodiments, the projection pattern is shone stroboscopically onto the surface of the object 120, and an image of the plurality of images is captured each time the projection pattern is shone on the surface of the object 120. As used herein, the term "stroboscopically" means repetitively with a fixed rate (e.g., 15 frames per second).

Figure 2:
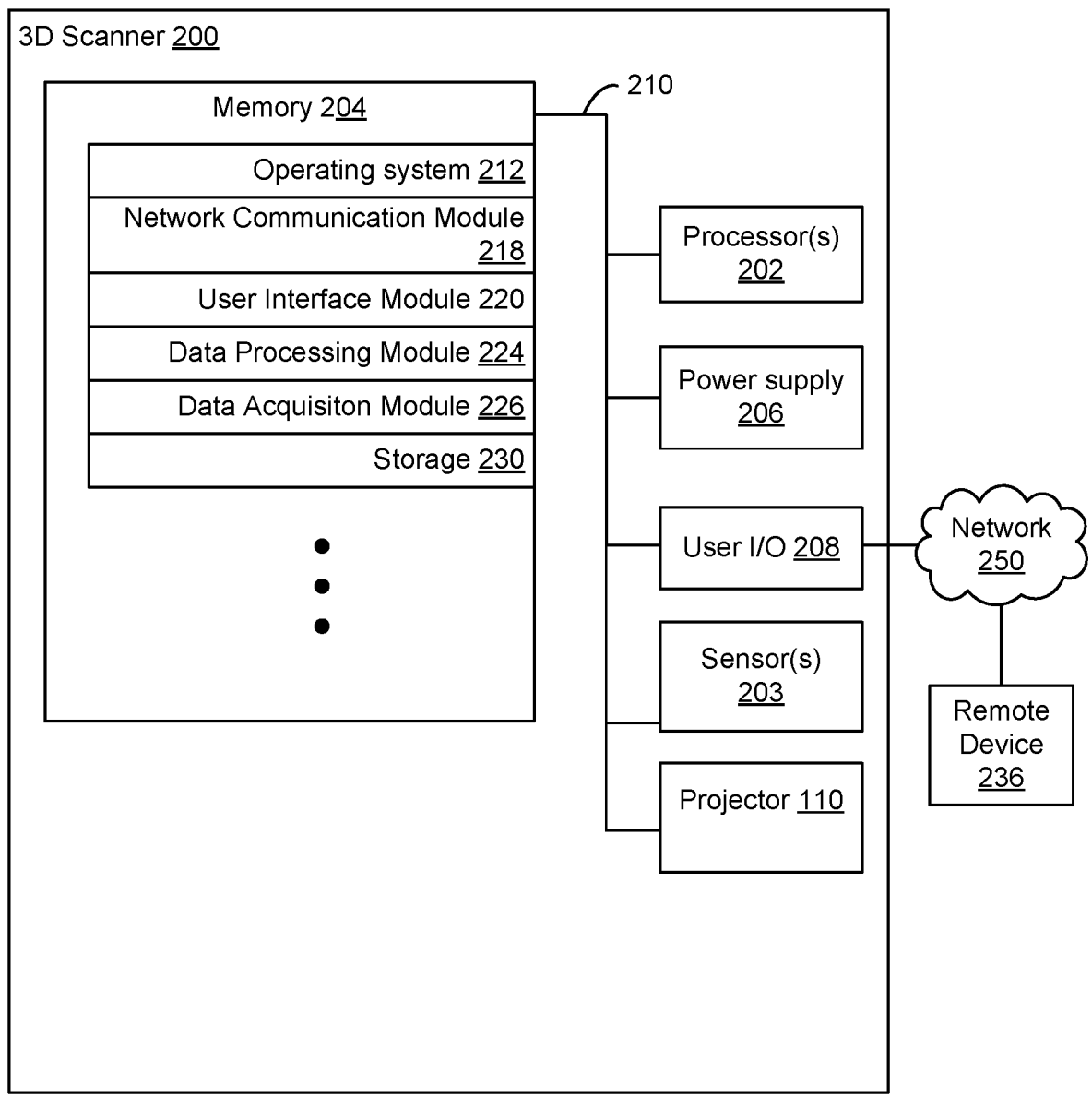
FIG. 2 is a block diagram of an imaging system in accordance with some embodiments.

Note that, although the projector 110 and the camera 112 are shown separately in FIGS. 1A-1B, in some embodiments, the projector 110 and camera 112 are integrated into a single housing as a 3D scanner 200 (FIG. 2). A user of the 3D scanner 200 may scan the object by moving the 3D scanner 200 with respect to object 120 while collecting data. Thus, in some embodiments, the images of the object 120 are captured by the camera(s) 112 from different angles or positions.

Each image of the plurality of images shows an imaged pattern that corresponds to the projection pattern, as distorted due to the surface of the object 120. Thus, the imaged pattern includes a plurality of imaged elements, each of which corresponds to a respective projection element in the projection pattern.

FIG. 1B illustrates another example of the operation of a 3D imaging environment 100. As shown in FIG. 1B, the projector 110 projects the same projection pattern as in FIG. 1A towards object 120. In this example, another object 122 is disposed in the path of ray 190-3 and thus, ray 190-3 is reflected at a surface of object 122. Note that object 122 may be an integral portion of object 120 (e.g., a handle of a drinking mug) or a separate object. The camera(s) 112 capture a plurality of images of the objects 120 and 122. As shown, the presence of object 122 causes ray 192-3 (which corresponds to ray 190-3) to be incident upon the camera(s) 112 at a different location than shown in FIG. 1A. Thus, the plurality of images captured by camera(s) 112 will show an imaged element corresponding to rays 190-3 and 192-3 in a different position (and possibly in a different order) in the imaged pattern relative to the other imaged elements of the imaged pattern.

Figures 1C, 1D:
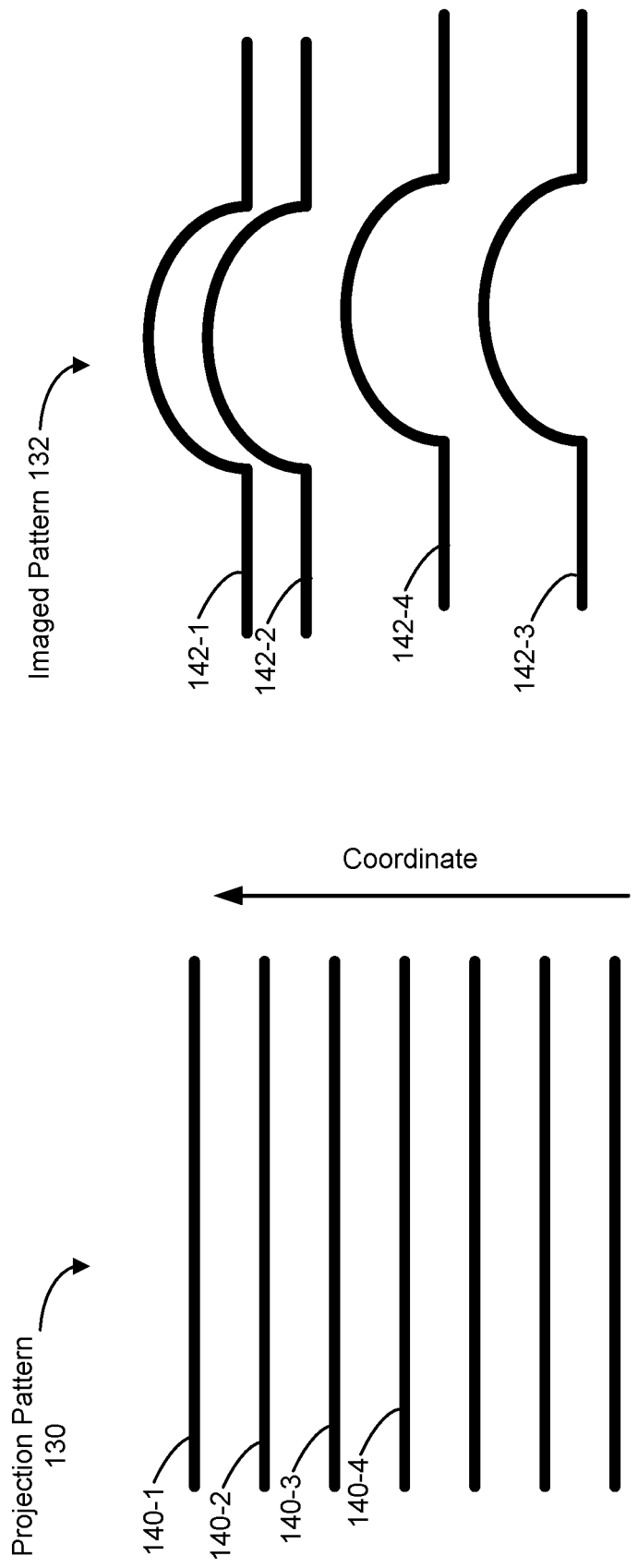
FIG. 1C illustrates a projection pattern in accordance with some embodiments.
FIG. 1D illustrates an imaged pattern in accordance with some embodiments.

FIG. 1C shows an example of the projection pattern 130 emitted from the projector 110, and FIG. 1D shows an example of an imaged pattern 132 captured by the camera(s) 112.

In the example shown in FIG. 1C, the projection pattern 130 includes a plurality of projection elements 140. For example, the projection pattern 130 shown in FIG. 1C may be projected by the projector 110 onto the objects 120 and 122, as shown in FIG. 1B. In this case, the projection elements 140 are lines that are repeated. In some embodiments, as discussed in U.S. application Ser. No. 11/846,494, the lines have alternating thick and thin regions. In some embodiments, the alternating thick-and-thin regions differ from line-to-line, but the lines are still considered non-coded elements.

FIG. 1D is an example of an imaged pattern 132 that is captured by the camera(s) 112 while the projector 110 projects the projection pattern 130 toward the objects 120 and 122, as shown in FIG. 1B. The image includes a plurality of imaged elements 142. In this case, the imaged elements 142 are distorted lines. Each of the imaged elements 142 (e.g., distorted lines) corresponds to a respective projection element 140 (e.g., a respective line) in the projection pattern 130. In this example, imaged element 142-1 in the imaged pattern 132 corresponds to projection element 140-1 in the projection pattern 130; imaged element 142-2 in the imaged pattern 132 corresponds to projection element 140-2 in the projection pattern 130; imaged element 142-3 in the imaged pattern 132 corresponds to projection element 140-3 in the projection pattern 130; and imaged element 142-4 in the imaged pattern 132 corresponds to projection element 140-4 in the projection pattern 130. Note that, due to the geometry of the object being scanned (as shown with reference to FIG. 1B), imaged elements may be transposed relative to positions of the respective projection elements 140 in the projection pattern 130. For example, the relative order of imaged elements 142-3 and 142-4 is reversed as compared with projection elements 140-3 and 140-4.

In order to construct a model of the surface of the object using a structured light approach, a computer system needs to know the correspondence between the image and the projection pattern (e.g., the coordinates of the projection pattern that correspond to each pixel in the image and/or the correspondence between imaged element and projection element). There are two general approaches to solving this ambiguity problem: one method utilizes patterns with coded elements and an alternative method relies on patterns with non-coded elements. In patterns with coded elements, the elements in the pattern have some unique identifying characteristic that allows the computer system to identify each imaged element. In patterns with non-coded elements, the elements in the pattern (e.g., lines or repetitive elements) lack individual unique characteristics that allow a particular element of pattern to be identified in the captured image. With non-coded elements (e.g., lines), some other method is needed to determine the correspondence between the image and the projection pattern.

In some embodiments, the projection pattern is a non-coded pattern of light such that the projection elements of the projection pattern are non-coded elements. In some embodiments, as will be described in detail below, the correspondence between the projection pattern and images of the object with the projection pattern shone thereon is determined using a neural network. In some embodiments, a non-coded pattern of light includes structured light patterns such as lines or other repetitive elements.

Although FIG. 1C and 1D illustrate examples in which the plurality of projection elements 140 in the projection pattern 130 are lines, it is understood that the projection elements 140 and imaged elements 142 may take any shape. For example, the projection elements 140 may be bars, zig-zag elements, dots, squares, a series of 3 small bars, and so on. Non-limiting examples of images showing the imaged pattern formed by objects that are illuminated with a projection pattern are provided in FIGS. A1 and A2 in Appendix A of U.S. Provisional Application No. 63/070,066, which is incorporated herein by reference in its entirety.

FIG. 2 is a block diagram of 3D scanner 200, in accordance with some embodiments. 3D scanner 200, or the computer system of 3D scanner 200, typically includes memory 204, one or more processor(s) 202, a power supply 206, user input/output (I/O) subsystem 208, one or more sensors 203 (e.g., including camera(s) 112, FIG. 1A-1B), a projector 110, and a communication bus 210 for interconnecting these components. The processor(s) 202 execute modules, programs, and/or instructions stored in memory 204 and thereby perform processing operations.

In some embodiments, the processor(s) 202 include at least one central processing unit. In some embodiments, the processor(s) 202 include at least one graphical processing unit. In some embodiments, the processor(s) 302 include at least one neural processing unit (NPU) for executing the neural networks described herein. In some embodiments, the processor(s) 202 include at least one field programmable gate array.

In some embodiments, memory 204 stores one or more programs (e.g., sets of instructions) and/or data structures. In some embodiments, memory 204, or the non-transitory computer readable storage medium of memory 204 stores the following programs, modules, and data structures, or a subset or superset thereof:

an operating system 212 that includes procedures for handling various basic system services and for performing hardware-dependent tasks;

network communication module(s) 218 for connecting the 3D scanner to other computer systems (e.g., remote device 236) via one or more communications network(s) 250;

a user interface module 220 that receives commands and/or inputs from a user via user input/output (I/O) subsystem 208 and provides outputs for presentation and/or display on user input/output (I/O) subsystem 208;

data processing module 224 for processing or pre-processing data from sensors 203, including optionally performing any or all of the operations described with respect to method 500 (FIGS. 5A-5C) and/or method 700 (FIG. 7). Alternatively, in various embodiments, any or all of the data processing may be performed by remote device 236 to which 3D scanner 200 is coupled through network 250;

data acquisition module 226 for controlling the cameras, projectors, and readout of the sensors; and storage 230 including buffer(s), RAM, ROM, and/or other memory that stores data used and generated by 3D scanner 200.

The above identified modules (e.g., data structures and/or programs including sets of instructions) need not be implemented as separate software programs, procedures, or modules, and thus various subsets of these modules may be combined or otherwise re-arranged in various embodiments. In some embodiments, the memory 204 stores a subset of the modules identified above. Furthermore, the memory 204 may store additional modules not described above. In some embodiments, the modules stored in the memory 204, or a non-transitory computer readable storage medium of the memory 204, provide instructions for implementing respective operations in the methods described below. In some embodiments, some or all of these modules may be implemented with specialized hardware circuits (e.g., FPGAs) that subsume part or all of the module functionality. One or more of the above identified elements may be executed by one or more of the processor(s) 202.

In some embodiments, the user input/output (I/O) subsystem 208 communicatively couples the 3D scanner 200 to one or more devices, such as one or more remote device(s) 236 via a communications network 250 and/or via a wired and/or wireless connection. In some embodiments, the communications network 250 is the Internet. In some embodiments, the user input/output (I/O) subsystem 208 communicatively couples the 3D scanner 200 to one or more integrated or peripheral devices, such as a touch-sensitive display.

In some embodiments, projector 110 includes one or more lasers. In some embodiments, the one or more lasers comprise vertical-cavity surface-emitting lasers (VCSELs). In some embodiments, projector 110 also include an array of light emitting diodes (LEDs) that produce visible light. In some embodiments, instead of a laser, projector 110 includes a flash bulb or some other light source.

The communication bus 210 optionally includes circuitry (sometimes called a chipset) that interconnects and controls communications between system components.

Figure 3:
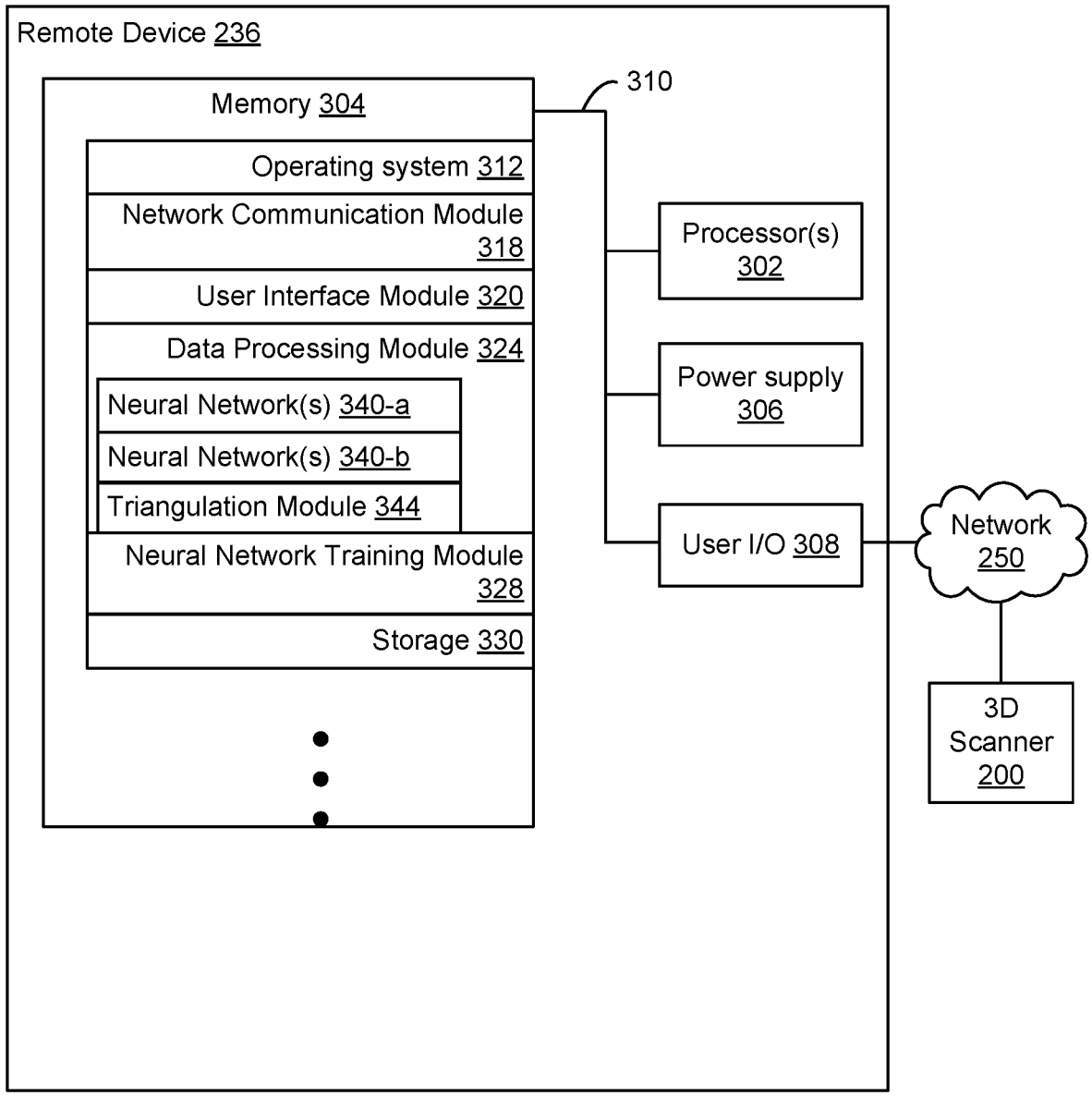
FIG. 3 is a block diagram of a remote device in accordance with some embodiments.

FIG. 3 is a block diagram of remote device 236, coupled with 3D scanner 200 via network 250, in accordance with some embodiments. Remote device 236 typically includes memory 304, one or more processor(s) 302, a power supply 306, user input/output (I/O) subsystem 308, and a communication bus 310 for interconnecting these components. The processor(s) 302 execute modules, programs, and/or instructions stored in memory 304 and thereby perform processing operations.

In some embodiments, the processor(s) 302 include at least one central processing unit. In some embodiments, the processor(s) 302 include at least one graphical processing unit. In some embodiments, the processor(s) 302 include at least one neural processing unit (NPU) for executing the neural networks described herein. In some embodiments, the processor(s) 302 include at least one field programmable gate array.

In some embodiments, memory 304 stores one or more programs (e.g., sets of instructions) and/or data structures. In some embodiments, memory 304, or the non-transitory computer readable storage medium of memory 304 stores the following programs, modules, and data structures, or a subset or superset thereof:
- an operating system 312 that includes procedures for handling various basic system services and for performing hardware-dependent tasks;
- network communication module(s) 318 for connecting the remote device 236 to other computer systems (e.g., 3D scanner 200) via one or more communications network(s) 250;
- a user interface module 320 that receives commands and/or inputs from a user via user input/output (I/O) subsystem 308 and provides outputs for presentation and/or display on user input/output (I/O) subsystem 308;
- data processing module 324 for processing data from 3D scanner 200, including optionally performing any or all of the operations described with respect to method 500 (FIGS. 5A-5C) and/or method 700 (FIG. 7). In some embodiments, data processing module 324 includes a neural network module 340 (for determining correspondence between images and projection patterns) and triangulation module 344 for executing a triangulation algorithm to determine spatial coordinates of an object using the correspondence determined by neural network module 340. In some embodiments, neural network module 340 includes instructions for executing neural networks 340-a and 340-b, described below with reference to FIG. 4;
- neural network training module 328 for training a neural network to determine correspondences between imaged elements in an imaged pattern and projection elements in a projection pattern, including, optionally, performing any or all of the operations described with respect to method 600 (FIGS. 6A-6B) or the alternative method mentioned therein.
- storage 330 including buffer(s), RAM, ROM, and/or other memory that stores data used and generated by remote device 236.

The above identified modules (e.g., data structures and/or programs including sets of instructions) need not be implemented as separate software programs, procedures, or modules, and thus various subsets of these modules may be combined or otherwise re-arranged in various embodiments. In some embodiments, the memory 304 stores a subset of the modules identified above. Furthermore, the memory 304 may store additional modules not described above. In some embodiments, the modules stored in the memory 304, or a non-transitory computer readable storage medium of the memory 304, provide instructions for implementing respective operations in the methods described below. In some embodiments, some or all of these modules may be implemented with specialized hardware circuits (e.g., FPGAs) that subsume part or all of the module functionality. One or more of the above identified elements may be executed by one or more of the processor(s) 302.

In some embodiments, the user input/output (I/O) subsystem 308 communicatively couples the remote device 236 to one or more devices, such as one or more 3D scanners 200 or an external display via a communications network 250 and/or via a wired and/or wireless connection. In some embodiments, the communications network 250 is the Internet. In some embodiments, the user input/output (I/O) subsystem 308 communicatively couples the remote device 236 to one or more integrated or peripheral devices, such as a touch-sensitive display.

The communication bus 310 optionally includes circuitry (sometimes called a chipset) that interconnects and controls communications between system components.

Figure 4:
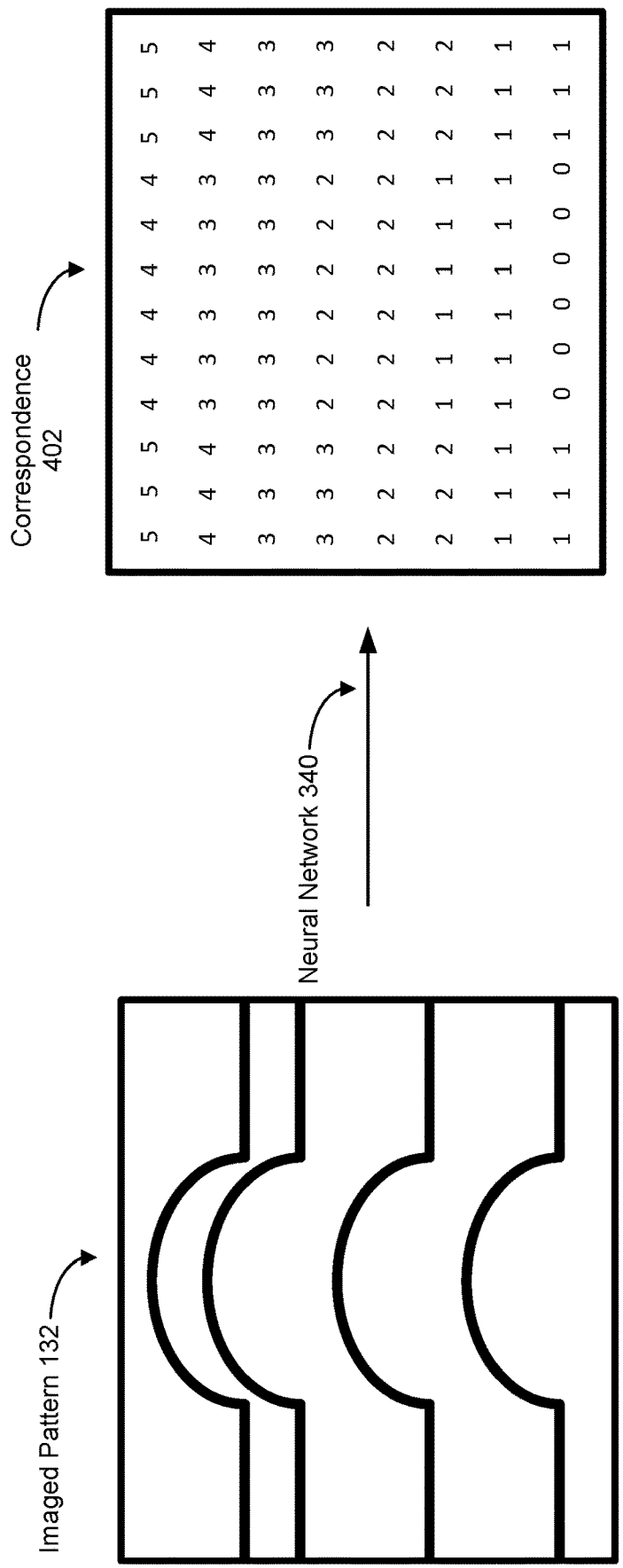
FIG. 4 illustrates inputs and outputs of a neural network in accordance with some embodiments.

FIG. 4 illustrates inputs and outputs of neural network 340-a in accordance with some embodiments. As noted above, one problem, which arises in the context of a structured light approach to 3D scanning, is the ambiguity of elements imaged on the surface of an object (e.g., the need to know which element in the image corresponds to which element on the slide). In accordance with some embodiments, this problem is solved by using a neural network trained to determine the correspondence between projection elements and the elements imaged on the surface of the object (or, more generally, between image pixels and their corresponding coordinates within a projection pattern). To that end, imaged pattern 132 (described with reference to FIG. 1C) is provided as an input to neural network 340 (imaged pattern 132 being an image of a surface of an object as a projection pattern is shone onto the surface of the object). In some embodiments, neural network 340 outputs a correspondence 402. In some embodiments, the correspondence 402 is an "image" with the same number of pixels as imaged pattern 132. For example, in some embodiments, an input to the neural network 340 is a 9 megapixel photograph of the surface of the object while the projection pattern is shone thereon and an output of the neural network is a 9 megapixel output "image", where each pixel corresponds in a one-to-one fashion to the input image. That is, each pixel in the correspondence 402 "image" is a value representing the correspondence between what is imaged in imaged pattern 132 and the projection pattern. For example, the values "4" in correspondence 402 indicate that those pixels within imaged pattern 132 correspond to a coordinate (or line) with the value "4" in the projection pattern (note that the range of values within the coordinate system of the projection pattern is arbitrary and may range from 0 to 1, 0 to 10, or have some other range).

In some embodiments, the neural network 340-a receives additional inputs. For example, the neural network receives information about the projection pattern.

In some embodiments, neural network 340-a outputs a coarse value for the correspondence and neural network 340-b outputs a fine value for the correspondence. In some embodiments, 340-b operates in an analogous manner to neural network 340-a except that neural network 340-b receives, as inputs, the image of the surface of the object and the output of neural network 340-a (e.g., neural network 340-a and 340-b are cascaded). Note that any number of neural networks, in any arrangement, may be used. For example, in some embodiments, 3 or 4 neural networks are used, with some arranged in a cascaded manner and some arranged to operate independently.

Figure 5C:

FIGS. 5A-5C illustrate a flow chart of a method 500 for providing 3D reconstruction from a 3D imaging environment 100, in accordance with some embodiments. The method 500 is performed at computing device that has processor(s) and memory storing program(s) configured for execution by the processor(s). In some embodiments, method 500 is performed at computing device that is in communication with a 3D scanner 200. In some embodiments, certain operations of method 500 are performed by a computing device that is distinct from the 3D scanner 200 (e.g., a computer system that receives and/or transmits from the 3D scanner 200). In some embodiments, certain operations of method 500 are performed by a computing device that stores the neural network(s) 340 and such that the trained neural network(s) 340 can be used as part of a 3D reconstruction based on images captured by 3D scanner 200. Some operations in method 500 are, optionally, combined and/or the order of some operations is, optionally, changed.

In various embodiments, method 500 may include any of the features or operations of method 700, described below, so long as those features or operations are not inconsistent with method 500 as described. For brevity, some of those detail described with reference to method 700 are not repeated here.

The method 500 includes obtaining (510) an image of an object (e.g., object 120 illustrated in FIGS. 1A and 1B). The image includes a plurality of imaged elements 142 of an imaged pattern 132. The imaged pattern 132 corresponds to a projection pattern 130 that is projected onto a surface of the object 120. The projection pattern 130 includes a plurality of projection elements 140. The method 500 also includes using (520) a neural network (e.g., neural network 340-*a*) to output a correspondence between the plurality of imaged elements 142 and the plurality of projection elements 140. In some embodiments, the neural network outputs the correspondence directly (e.g., at least a plurality of nodes in an output layer of the neural network have a one-to-one correspondence with a least of plurality of nodes in the input layer). In some embodiments, the neural network is a classification neural network (e.g., classifying each pixel of the input image by its correspondence to the projection pattern).

It is noted that conventional neural networks are trained to recognize different instances of the same thing. For example, neural networks can be trained to recognize human-written characters using examples of the human-written characters. In contrast, in accordance with the embodiments described herein, it has been found that a neural network can be trained to determine correspondence between projection elements and elements imaged on the surface of an object, even if training data did not include another instance of that object. For example, by training the neural network on data from objects having a wide variety of features, neural network can be used to determine element correspondence when scanning a whale skull of a previously undiscovered extinct species, even though the training data did not include skulls of that species.

Complex geometries of the object (e.g., narrow features, sharp edges, deep grooves, etc.) exacerbate the difficulty of determining element correspondence. Here, the inventors have additionally found that using a trained neural network results in an improvement in image resolution and completeness, especially in the presence of "sharp" features in the object.

In some embodiments, the method 500 includes inputting (522) a value for each respective pixel of the image of the object 120 onto a respective node in an input layer of the neural network (e.g., neural network 304-*a*).

In some embodiments, each respective pixel of the image of the object 120 corresponds (524) to a respective node in an output layer of the neural network. A value for the respective node in the output layer of the neural network represents the correspondence between the respective pixel and the plurality of projection elements 140 of the projection pattern 130 (e.g., the value represents the coordinates on the projection pattern).

In some embodiments, an output layer of the neural network has (526) a same size as the image of the object 120 (e.g., the neural network outputs an "image" with the same number of pixels as the input image, as described with reference to FIG. 4).

In some embodiments, an output layer of the neural network is (528) smaller than a size of the image. In some embodiments, the output layer of the neural network is larger than a size of the image.

In some embodiments, the method 500 includes inputting (530) information about the projection pattern 130 into an input layer of the neural network.

In some embodiments, the plurality of projection elements 140 of the projection pattern 130 projected onto the surface of the object 120 include (532) non-coded elements (e.g., any of the projection patterns with non-coded elements described in this document). In some embodiments, the plurality of projection elements 140 of the projection pattern 130 projected onto the surface of the object 12 includes lines.

In some embodiments, the neural network is trained (535) using simulated data. The simulated data includes a plurality of simulated images and each of the plurality of simulated images includes a simulated pattern that includes a plurality of simulated elements. Each of the plurality of simulated elements corresponds to a respective projection element of the plurality of projection elements projected onto the surface of a respective simulated object. Each of the plurality of simulated images also includes correspondence data indicating a correspondence between the plurality of simulated elements of the simulated images and the plurality of projection elements of the projection pattern.

In some embodiments, each of the plurality of simulated images includes (536) texture information regarding the respective simulated object.

In some embodiments, the texture information for the respective simulated object is (538) texture information other than a natural texture of the respective simulated object.

In some embodiments, the texture information for the respective simulated object includes (540) features that are similar to the plurality of projection elements 140 of the projection pattern.

In some embodiments, the texture information for the respective simulated object includes (542) text.

In some embodiments, the texture information for the respective simulated object includes (544) lines.

Figure 6B:
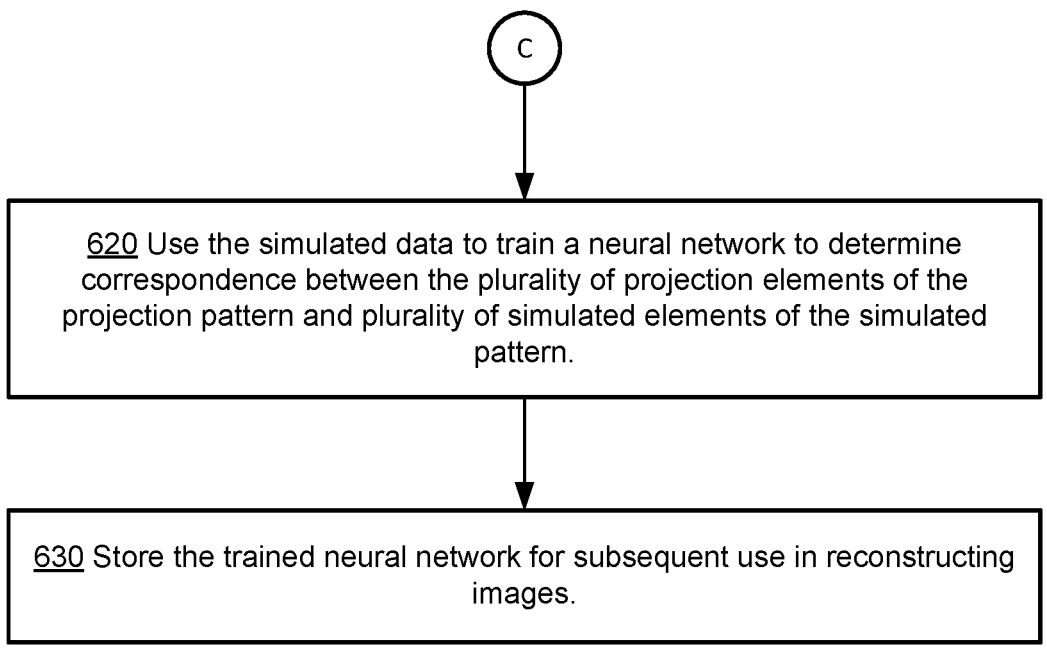

Operations 534-544 are described in greater detail below with respect to method 600 (FIGS. 6A-6B). That is, in some embodiments, the neural networks used in method 500 are trained using method 600.

In some embodiments, a plurality of neural networks are used. The neural networks may be cascaded or operate independently of one another. As a non-limiting example of cascaded networks, in some embodiments, the neural network is a first neural network (e.g., neural network 340-*a*), and the method 500 further includes using (550) a second neural network (e.g., neural network 340-*b*) to output an offset from (e.g., a refinement of) the correspondence between the plurality of imaged elements 142 and the plurality of projection elements 140 determined by the first neural network. Thus, in some embodiments, the resolution of 3D reconstructions is enhanced by using two neural networks: (i) a first neural network that identifies the correspondence between projection elements and the elements imaged on the surface of the object and (2) a second neural network that identifies an offset to the identified correspondence. In some embodiments, the second neural network outputs the offset directly (e.g., at least a plurality of nodes in an output layer of the second neural network have a one-to-one correspondence with each pixel in the input image). The inventors have found that this two-stage approach results in a marked and unexpected improvement to the resolution of the resulting image.

FIGS. 6A-6B illustrate a flow diagram of a method 600 of training neural network(s) 340 in accordance with some embodiments. The method 600 is performed (601) at computing device that has processor(s) and memory storing program(s) configured for execution by the processor(s). In some embodiments, method 600 is performed at computing device that is in communication with 3D scanner 200. In some embodiments, certain operations of method 600 are performed by a computing device that is distinct from the 3D scanner 200 (e.g., a computer system that receives and/or transmits from the 3D scanner 200). In some embodiments, certain operations of method 600 are performed by a computing device that trains and stores the neural network(s) 340 and such that the trained neural network(s) 340 can be used as part of a 3D reconstruction based on images captured by the 3D scanner 200. Some operations in method 600 are, optionally, combined and/or the order of some operations is, optionally, changed.

In accordance with some embodiments, method 600 uses simulated (also referred to as "synthetic") data in which the spatial relationship between the projector, the camera, and the object are known for each training image. One difficulty in training neural networks to determine correspondence between projection elements and elements imaged on the surface of an object is that the "ground truth" for training is difficult to obtain. There are often hundreds of thousands of elements projected on to the surface of the object. Existing algorithms for determining line correspondence suffer from the very problem that the neural networks of the instant disclosure solve. As such, existing algorithms cannot be used for providing ground truth for training such neural networks. Moreover, unlike in image analysis, character recognition and similar applications, human tagging is not practical in 3D scanning/reconstruction applications and would be just as error-prone as existing algorithms. These problems are solved by training the neural network using simulated data, where the exact correspondence and the geometry of the image acquisition is known. In this manner, training data can be generated for countless different object shape geometries and geometries of the camera and projector with respect to the object.

The method 600 includes generating (610) simulated data. The simulated data includes i) a plurality of simulated images (e.g., as shown in FIGS. A1-A2 of Appendix A of U.S. Provisional Application 63/070,066), ii) object data (e.g., as shown in FIGS. A3-A6 of the Appendix A of U.S. Provisional Application 63/070,066), and iii) correspondence data. The plurality of simulated images are images of a known projection pattern that is projected onto a surface of a simulated object. The projection pattern includes a plurality of an element, and each of the images includes imaged elements of a simulated pattern. Each of the imaged elements correspond to respective elements of the plurality of elements of the known projection pattern. The object data includes data that indicates the shape of the respective simulated object, and the correspondence data includes data indicating a correspondence between the imaged elements in the simulated images and respective elements of the plurality of elements of the known projection pattern. The method 600 further includes using the simulated data to train (620) a neural network to determine correspondence between the respective elements of the plurality of elements of the known projection pattern and imaged elements (e.g., imaged elements 142 of the imaged pattern 132) of the known projection pattern projected onto a surface of a real object and/or. The method 600 also includes storing (630) the trained neural network 340 for subsequent use in reconstructing images (e.g., use in method 500, FIGS. 5A-5C).

In some embodiments, the simulated data also includes (611) texture (e.g., color) information regarding the simulated object. In some embodiments, the plurality of simulated images also includes texture information regarding the respective simulated object. One difficulty in training neural networks to determine correspondence between projection elements and elements imaged on the surface of an object is that objects themselves have color, and the color is likely to vary over the image of the object (e.g., because the color of the object itself varies, or because of lighting, shadows, etc.) This makes it difficult to distinguish the pattern from the texture of the object itself. This problem is solved by using simulated training data with a variety of textures and reflectiveness (in effect, making the problem more challenging during training phase, such that the neural network is more effective once trained). In particular, the inventors have found that texturing the simulated objects to include text, patterns, or other abrupt (high contrast) texture features, is particularly effective at teaching the neural network to distinguish between object texture and the projection elements (e.g., because text involves high contrast variations between light and dark, as does the projected pattern).

In some embodiments, the texture information for the respective simulated object is (612) texture information other than a natural texture of the respective simulated object.

In some embodiments, the texture information for the respective simulated object includes (613) features that are similar to the plurality of elements of the known projection pattern.

In some embodiments, the texture information for the respective simulated object includes (614) text.

In some embodiments, the texture information for the respective simulated object includes (615) lines.

In some embodiments, the respective simulated object includes (616) one or more sharp features.

In some embodiments, an alternative method of training a neural network is provided, the alternative method includes generating simulated data, comprising: a plurality of simulated images of a projection pattern projected onto a surface of a respective simulated object; data indicating a shape of the respective simulated object; and data indicating a correspondence between respective pixels in the simulated images and coordinates on the projection pattern. The alternative method further includes, using the simulated data to train a neural network to determine correspondence between images and projection pattern. The alternative method further includes storing the trained neural network for subsequent use in reconstructing images. Note that, in some embodiments, the alternative method of training the neural network may share any of the features or operations of method 600, described above, so long as those features or operations are not inconsistent with the alternative method.

FIG. 7 illustrates a flow chart of a method 700 for providing 3D reconstruction from a 3D imaging environment 100, in accordance with some embodiments. The method 700 is performed at computing device that has processor(s) and memory storing program(s) configured for execution by the processor(s). In some embodiments, method 700 is performed at computing device that is in communication with a 3D scanner 200. In some embodiments, certain operations of method 700 are performed by a computing device that is distinct from the 3D scanner 200 (e.g., a computer system that receives and/or transmits from the 3D scanner 200). In some embodiments, certain operations of method 700 are performed by a computing device that stores the neural network(s) 340 and such that the trained neural network(s) 340 can be used as part of a 3D reconstruction based on images captured by 3D scanner 200. Some operations in method 700 are, optionally, combined and/or the order of some operations is, optionally, changed.

In various embodiments, method 700 may include any of the features or operations of method 500, described above, so long as those features or operations are not inconsistent with method 700 as described. For brevity, some of those detail described with reference to method 500 are not repeated here.

The method 700 includes obtaining (702) an image of an object while a projection pattern is shone on the surface of the object. In some embodiments, the projection pattern is generated by passing light through a slide. In some embodiments, a coordinate system is associated with the projection pattern. The coordinate system describes the location of each position of the projection pattern on the slide.

Method 700 further includes using (704) a neural network to output a correspondence between respective pixels in the image and coordinates of the projection pattern (e.g., with respect to the coordinate system). To do so, in some embodiments, the image is provided to an input layer of the neural network (e.g., neural network 340-a). In some embodiments, an output layer of the neural network directly produces each pixel's corresponding coordinate(s) within the projection pattern. For example, the neural network outputs an output image with the same number of pixels as the input image, wherein each pixel of the output image has a one-to-one correspondence with a pixel of the input image and holds a value for that input pixel's coordinate(s) on the projection pattern. In this manner, the output image is spatially-correlated with the input image.

In some embodiments, the neural network is trained using method 600 or the alternative method, described above.

Note that, in some embodiments, the neural network outputs two coordinates for each pixel of the input image (e.g., an x- and a y-coordinate on the slide pattern). Alternatively, in some embodiments, the neural network outputs only a single coordinate for each pixel of the input image. In such embodiments, the other coordinate is known or can be inferred from an epi-polar geometry of the scanner 200.

In some embodiments, a plurality of neural networks may be used to determine the projection pattern coordinates of each pixel of the input image. For example, in some embodiments, a first neural network determines coarse coordinates, whereas a second neural network determines fine coordinates (e.g., a refinement of the coordinates of the first neural network). In various embodiments, the first neural network and the second neural network may be arranged in a cascaded manner (e.g., such that the output of the first neural network is input into the second neural network), or the two neural networks may operate independently, with their outputs combined. In various embodiments, more than two neural networks (e.g., four neural networks) may be used.

In some embodiments, the input image is a multi-channel image. As a non-limiting example, the input image may include 240×320 pixels, but may store more than one value for each pixel (e.g., three values in the case of an RGB image). In some embodiments, additional channels are provided to input additional information into the neural network. Continuing with the non-limiting example, the input image would then have a size 240×320×n, where n is the number of channels. For example, in some embodiments, information about the projection pattern is input into the neural network as an additional "channel" for each image. In some embodiments, one or more of the channels includes information obtained while the projection pattern is not shone onto the surface of the object. For example, a grayscale image of the projection pattern shone onto the surface of the object may be stacked with an RGB image, obtained in temporal proximity (e.g., within 200 milliseconds) of the grayscale image, wherein the RGB image was obtained without the projection pattern being shone onto surface of the object (recall that, in some embodiments, the projection pattern is shone stroboscopically onto the surface of the object).

In some embodiments, the output image is a multi-channel image. In some embodiments, one channel of the multi-channel output image provides the correspondence, as described above. Continuing with the non-limiting example described above, each channel of the output image may include 240×320 pixels. The output would then have a size 240×320×m, where m is the number of channels. One of the channels stores the values for the correspondence (e.g., values for one or more coordinates on the projection pattern). In some embodiments, another channel in the output image stores a confidence value for each correspondence value for each pixel. The confidence value for the correspondence value for each pixel may be used in reconstruction (e.g., by weighting data differently or by discarding data where the confidence value is too low). In some embodiments, the output image may also include a channel describing the curvature of the object, a channel describing a texture of the object, or any other information that is spatially-correlated to the input image.

One of skill in the art will appreciate that the input and output images may be of any size. For example, rather than 240×320 pixel images, as described in the non-limiting example above, in some embodiments, 9 megapixel images (or images of any other size) may be used.

It is noted that conventional neural networks are trained to recognize different instances of the same thing. For example, neural networks can be trained to recognize human-written characters using examples of the human-written characters. In contrast, in accordance with the embodiments described herein, it has been found that a neural network can be trained to determine correspondence between respective pixels in an image and coordinates of the projection pattern, even if training data did not include another instance of that object. For example, by training the neural network on data from objects having a wide variety of features, a neural network can be used to determine correspondence when scanning a whale skull of a previously undiscovered extinct species, even though the training data did not include skulls of that species.

Complex geometries of the object (e.g., narrow features, sharp edges, deep grooves, etc.) exacerbate the difficulty of determining correspondence. Here, the inventors have additionally found that using a trained neural network results in an improvement in image resolution and completeness, especially in the presence of "sharp" features in the object. Examples of 3D reconstructed images using conventional methods and using neural networks in accordance with the instant invention are provided in FIGS. A7-A18 of Appendix A of U.S. Provisional Application 63/070,066 (note that FIGS. A7-A9 are single image reconstructions, whereas FIGS. A10-A18 are multi-image reconstructions). These reconstructed images illustrate significantly better quality images reconstructed in accordance with the instant invention, including better resolution and completeness of the images.

Method 700 further includes using (706) the correspondence between respective pixels in the image and coordinates of the projection pattern, reconstructing a shape of the surface of the object (e.g., using a triangulation algorithm).

It should be understood that the particular order in which the operations in FIGS. 5A-5B and 6A-6B have been described is merely an example and is not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

It will also be understood that, although the terms first, second, etc. are, in some instances, used herein to describe various elements, these elements should not be limited by these terms. These terms are only used to distinguish one element from another. For example, a first neural network could be termed a second neural network, and, similarly, a second neural network could be termed a first neural network, without departing from the scope of the various described embodiments. The first neural network and the second neural network are both neural network, but they are not the same neural network, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

What is claimed is:

1. A method, comprising:
    obtaining an image of an object, wherein the image includes a plurality of imaged elements of an imaged pattern, wherein:
        the imaged pattern corresponds to a projection pattern that is projected onto a surface of the object via a slide; and
        the projection pattern includes a plurality of projection elements;
    providing the image of the object as an input to a neural network;
    using the neural network to output a correspondence between respective pixels of the plurality of imaged elements and coordinates of the plurality of projection elements, wherein the coordinates describe the position of respective projection elements of the projection pattern on the slide; and
    using the correspondence between the respective pixels of the plurality of imaged elements and the coordinates of the plurality of projection elements, reconstructing a shape of the surface of the object.

2. The method of claim 1, wherein the neural network is a first neural network; and
    the method further includes:
        using a second neural network to output an offset from the correspondence between the respective pixels of the plurality of imaged elements and the coordinates of the plurality of projection elements determined by the first neural network.

3. The method of claim 1, wherein using the neural network to output the correspondence between the respective pixels of the plurality of imaged elements and the coordinates of the plurality of projection elements includes inputting a value for each respective pixel of the image of the object onto a respective node in an input layer of the neural network.

4. The method of claim 1, wherein:
    each respective pixel of the image of the object corresponds to a respective node in an output layer of the neural network; and
    a value for the respective node in the output layer of the neural network represents the correspondence between the respective pixel and the coordinates of the plurality of projection elements of the projection pattern.

5. The method of claim 4, wherein the output layer of the neural network has a same size as the image of the object.

6. The method of claim 1, wherein an output layer of the neural network is smaller than a size of the image.

7. The method of claim 6, wherein using the neural network to output the correspondence between the respective pixels of the plurality of imaged elements and the coordinates of the plurality of projection elements includes inputting information about the projection pattern into an input layer of the neural network.

8. The method of claim 1, wherein the plurality of projection elements of the projection pattern projected onto the surface of the object comprise non-coded elements.

9. The method of claim 8, wherein the plurality of projection elements of the projection pattern projected onto the surface of the object comprise lines.

10. The method of claim 1, wherein:
the neural network is trained using simulated data, the simulated data comprising a plurality of simulated images, each of the plurality of simulated images comprising:
a simulated imaged pattern including a plurality of simulated elements, wherein each of the plurality of simulated elements corresponds to a respective projection element of the plurality of projection elements projected onto the surface of a respective simulated object; and
data indicating a correspondence between a plurality of simulated elements of the simulated imaged pattern and the plurality of projection elements of the projection pattern.

11. The method of claim 10, wherein, for each of the plurality of simulated images, the respective simulated object includes texture information.

12. The method of claim 11, wherein the texture information for the respective simulated object is texture information other than a natural texture of the respective simulated object.

13. The method of claim 12, wherein the texture information for the respective simulated object includes features similar to the plurality of projection elements of the projection pattern.

14. The method of claim 11, wherein the texture information for the respective simulated object includes text.

15. The method of claim 11, wherein the texture information for the respective simulated object includes lines.

16. A system, comprising:
one or more processors; and
memory storing instructions for performing a set of operations, the set of operations comprising:
obtaining an image of an object, wherein the image includes a plurality of imaged elements of an imaged pattern, wherein:
the imaged pattern corresponds to a projection pattern that is projected onto a surface of the object via a slide; and
the projection pattern includes a plurality of projection elements;
providing the image of the object as an input to a neural network;
using the neural network to output a correspondence between respective pixels of the plurality of imaged elements and coordinates of the plurality of projection elements, wherein the coordinates describe the position of respective projection elements of the projection pattern on the slide; and
using the correspondence between the respective pixels of the plurality of imaged elements and the coordinates of the plurality of projection elements, reconstructing a shape of the surface of the object.

17. The system of claim 16, wherein the neural network is a first neural network; and
the set of operations further includes:
using a second neural network to output an offset from the correspondence between the respective pixels of the plurality of imaged elements and the coordinates of the plurality of projection elements determined by the first neural network.

18. The system of claim 16, wherein using the neural network to output the correspondence between the respective pixels of the plurality of imaged elements and the coordinates of the plurality of projection elements includes inputting a value for each respective pixel of the image of the object onto a respective node in an input layer of the neural network.

19. The system of claim 16, wherein:
each respective pixel of the image of the object corresponds to a respective node in an output layer of the neural network; and
a value for the respective node in the output layer of the neural network represents the correspondence between the respective pixel and the coordinates of the plurality of projection elements of the projection pattern.

20. A non-transitory computer-readable storage medium storing instructions which, when executed by a computer system, cause the computer system to perform a set of operations, comprising:
obtaining an image of an object, wherein the image includes a plurality of imaged elements of an imaged pattern, wherein:
the imaged pattern corresponds to a projection pattern that is projected onto a surface of the object via a slide; and
the projection pattern includes a plurality of projection elements;
providing the image of the object as an input to a neural network;
using the neural network to output a correspondence between respective pixels of the plurality of imaged elements and coordinates of the plurality of projection elements, wherein the coordinates describe the position of respective projection elements of the projection pattern on the slide; and
using the correspondence between the respective pixels of the plurality of imaged elements and the coordinates of the plurality of projection elements, reconstructing a shape of the surface of the object.

* * * * *